(12) United States Patent
Navratil et al.

(10) Patent No.: US 8,487,930 B2
(45) Date of Patent: Jul. 16, 2013

(54) PROCESS MONITORING USING MULTIVARIATE DATA

(75) Inventors: Roman Navratil, Prague (CZ); Karel Marik, Revnice (CZ)

(73) Assignee: Honeywell International Inc., Morristown, NJ (US)

( * ) Notice: Subject to any disclaimer, the term of this patent is extended or adjusted under 35 U.S.C. 154(b) by 1748 days.

(21) Appl. No.: 11/372,507

(22) Filed: Mar. 10, 2006

(65) Prior Publication Data
US 2007/0211057 A1  Sep. 13, 2007

(51) Int. Cl.
G06T 11/20 (2006.01)

(52) U.S. Cl.
CPC ............. *G06T 11/206* (2013.01); *G06T 11/203* (2013.01)
USPC ......... 345/440; 345/440.2; 345/619; 345/443

(58) Field of Classification Search
CPC ............................ G06T 11/206; G06T 11/203
USPC ...................... 345/440, 440.2, 443
See application file for complete search history.

(56) References Cited

U.S. PATENT DOCUMENTS

| | | | | |
|---|---|---|---|---|
| 5,546,516 A | * | 8/1996 | Austel et al. | 345/440 |
| 5,917,500 A | * | 6/1999 | Johnson et al. | 345/440 |
| 6,587,108 B1 | * | 7/2003 | Guerlain et al. | 345/440 |
| 6,879,325 B1 | * | 4/2005 | Brooks et al. | 345/440 |
| 6,996,536 B1 | * | 2/2006 | Cofino et al. | 705/26 |
| 7,266,510 B1 | * | 9/2007 | Cofino et al. | 705/26 |
| 2003/0190409 A1 | * | 10/2003 | Schunk et al. | 427/8 |
| 2007/0211057 A1 | * | 9/2007 | Navratil et al. | 345/440 |
| 2007/0216683 A1 | * | 9/2007 | Navratil et al. | 345/440 |

OTHER PUBLICATIONS

Ying-Huey Fua; Ward, M.O.; Rundensteiner, E.A.; Hierarchical parallel coordinates for exploration of large datasets Visualization '99. Proceedings Oct. 29, 1999 pp. 43-508 Digital Object Identifier 10.1109/VISUAL.1999.809866.*
Visualizing concept drift Kevin B. Pratt, Gleb Tschapek Aug. 2003 KDD '03: Proceedings of the ninth ACM SIGKDD international conference on Knowledge discovery and data mining Publisher: ACM.*
Visual hierarchical dimension reduction for exploration of high dimensional datasets J. Yang, M. O. Ward, E. A. Rundensteiner, S. Huang May 2003 VISSYM '03: Proceedings of the symposium on Data visualisation 2003 Publisher: Eurographics Association.*
"Google tm Image Search—The most comprehensive image search on the web", http://images.google.com/imghp?sourceid=navclient&ie=UTF-8&ris=GGLD,GGLD:2004-35,GGLD:EN&Q=Parallel+Coordinate+Plot,(Observed Mar. 10, 2006),1 pg.

(Continued)

*Primary Examiner* — Javid A Amini
(74) *Attorney, Agent, or Firm* — Schwegman, Lundberg & Woessner, P.A.

(57) ABSTRACT

In an embodiment, a system and method are described that enable a display of a parallel coordinate plot. Such a parallel coordinate plot includes a plurality of parallel axes, and each of the parallel axes represents a variable. The display further includes one or more polygonal lines connecting values of the variables of the parallel axes. The system and method further enable a display of information about an additional variable on the parallel coordinate plot by varying the property of the one or more polygonal lines.

18 Claims, 6 Drawing Sheets

OTHER PUBLICATIONS

"Google tm Image Search—The most comprehensive search on the web", http://images.google.com/imghp?sourceid=navclient&ie=UTF-8&ris=GGLD,GGLD:2004-35,GGLD:EN&Q=Parallel%20Coordinate%20Plot&sa=N&sa=N&tab=wi,(Observed Mar. 10, 2006),1 pg.

"PCP User's Guide—The Apoala Project", http://web.archive.org/web/20021113223539/http://www.geovista.psu.edu/products/demos/edsall/Telets072799/pcpdescription.html,(archived Nov. 13, 2002),3 pgs.

Kourti, T., "Process analysis and abnormal situation detection: from theory to practice", *IEEE Control Systems Magazine*, 22(5), (Oct. 2002),10-25.

Raich, A., et al., "Statistical process monitoring and disturbance diagnosis in multivariable continuous processes", *AIChE Journal*, 42(4), (1996),995-1009.

\* cited by examiner

PROCESS MONITORING USING MULTIVARIATE DATA

TECHNICAL FIELD

Various embodiments relate to the field of data analysis, and in an embodiment, but not by way of limitation, to the analysis of multivariate data.

BACKGROUND

One manner known in the art to analyze multivariate data is through the use of parallel coordinate plots. A typical parallel coordinate plot includes several parallel axes, each axis representing a variable. Values for each of those variables are plotted on each respective axis. A polygonal line connects each of a set of the values of the variables. For example, the variables pertaining to the parallel axes could represent the consumption per capita of the different sources of protein (e.g., milk, eggs, beef, pork, chicken, fish, etc.), and a polygonal line connecting those values could represent the country to which those values pertain. While the use of parallel coordinate plots offer some advantages over a two coordinate system, such plots, like their two coordinate plot cousins, tend to offer a static representation of the multivariate data.

SUMMARY

In an embodiment, a system and method are described that enable a display of a parallel coordinate plot. Such a parallel coordinate plot includes a plurality of parallel axes, and each of the parallel axes represents a variable. The display further includes one or more polygonal lines connecting values of the variables of the parallel axes. The system and method further enable a display of values of an additional variable, which may be continuous in nature, wherein the values of this additional variable are not represented by the position of a polygonal line along the parallel axes, but rather are represented by a property of the polygonal line. The line property correlates with the values of the additional variable.

DETAIL DESCRIPTION

Figure 1:
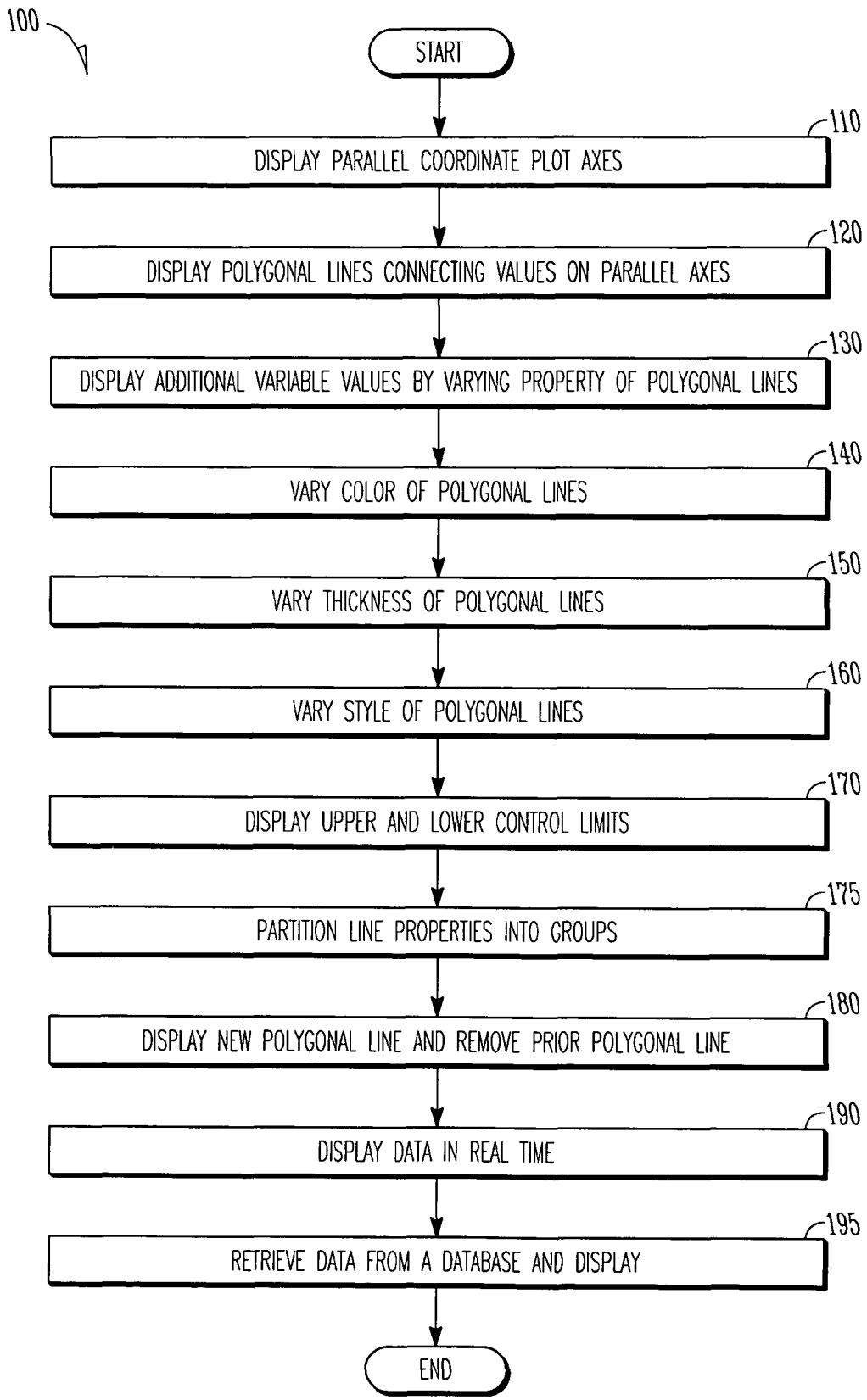
FIG. 1 illustrates an example embodiment of a process to generate parallel coordinate plots.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

One or more figures show block diagrams of systems and apparatus for an architecture for a network system, in accordance with embodiments of the invention. One or more figures show flow diagrams illustrating operations for an architecture for a network system. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

FIG. 1 illustrates an embodiment of a process 100 that may be invoked to enable the generation a parallel coordinate plot. In an embodiment, a parallel plot may be enabled by programming a processor to effect the display of a parallel coordinate plot on a monitor. A parallel coordinate plot 200 illustrated in FIGS. 2A-2D includes in an embodiment several parallel axes 210A, 210B, 210C, and 210D. The parallel coordinate plot of FIGS. 2A-2D relates to data and variables relating to the production of power. Each parallel axis represents a variable. In the embodiment of FIGS. 2A-2D, the axis 210A represents time, axis 210B represents a load, axis 210C represents the outdoor temperature, and axis 210D represents the price of a kilowatt hour of power. In the embodiment of FIGS. 2A-2D, polygonal lines 220A, 220B, 220C, and 220D connect the values of the variables on the parallel axes. For example, the polygonal line 220A connects values of the power load, outdoor temperature, and price per kilowatt at a particular hour of the day. The resulting parallel coordinate plot provides a useful means to analyze the relationship between these variables.

Referring back to FIG. 1, the process 100 displays parallel coordinate plot axes at operation 110. As explained supra, in an embodiment, such a parallel coordinate plot includes several parallel axes, wherein each of the parallel axes represents a variable. The display of the parallel coordinate plot further includes connecting values on each of the parallel axes by displaying one or more polygonal lines at operation 120. After the display of the one or more polygonal lines, the process 100 displays information about an additional variable at operation 130. In an embodiment, this information about an additional variable is displayed by varying the property of the original polygonal line, wherein this property changes as a function of the additional variable values. The additional variable is typically continuous in nature, but can be discrete also.

In an embodiment, the information about an additional variable that may displayed on a parallel coordinate plot may include variables that are not part of the parallel coordinate plot. For example, the variables of the parallel coordinate plot of FIG. 2A include the time, load, temperature, and price. To this plot could be added an additional variable such as wind velocity, and the effect of the wind velocity on the other variables could be indicated by varying the property of the lines already present on FIG. 2A. For example, if the wind velocity at the time that a particular set of data (i.e., hour, load, temperature, price) was collected is greater than 40 miles per hour, the polygonal line representing that set of data may be changed to a particular color—e.g., red. Similarly, if the wind velocity was less than 40 miles per hour, the color of the polygonal lines for those sets of data may be changed to blue. Consequently, the correlation, or the lack of correlation, between the wind velocity and any of the other variables on the parallel coordinate plot can easily been seen. Therefore, if on FIG. 2A lines 220A and 220B represent values of variables that were collected when the wind velocity was less than 40 miles per hour, the color property of those lines will be changed to blue. Likewise, if lines 220C and 220D represent values of variables that were collected when the wind velocity was greater than 40 miles per hour, the color property of those lines will be changed to red. Then, a person viewing a parallel coordinate plot such as FIG. 2A would see that the red polygonal lines tend to be associated with high load values, and that the blue polygonal lines tend to be associated with low load values, thereby indicating a possible correlation between the wind velocity and the power load of a power generating system. In an embodiment, line property may vary continuously as a function of the additional variable values.

In another embodiment, the information about an additional variable that may be displayed on a parallel coordinate plot may include one or more property groupings. This embodiment may be useful in determining whether a correlation exists between two parallel axes which are distant from each other on the parallel coordinate plot. For example, referring again to FIG. 2A, one may want to determine if there is a relationship between the hour and the price. However, since the hour and price axes are separated by two other intervening axes, any such relationship may be difficult to glean. However, if the color gradient of the polygonal lines is such that the color correlates with the value of the hour variable, then the color gradient of those polygonal lines as they intersect the price axis may be used to more clearly illustrate any correlation between the hour and the price.

As another example, the hour variable is considered as an additional variable, and a polygonal line property that correlates with the hour value may be grouped into previous time periods and non-previous (i.e., present and/or future) time periods. Such grouping may be conducive to a historical and/or forecasting types of data analyses.

As just described, in an embodiment, the property of the polygonal lines that is varied is the color of the polygonal lines at operation 140. In another embodiment, the property of the polygonal lines that is varied in the thickness of the polygonal lines at operation 150. In yet another embodiment, the property of the polygonal lines that is altered is the style of the polygonal lines at operation 160. The variation of the properties of the polygonal lines results in a parallel coordinate plot with information about an additional variable, and a parallel coordinate plot that is much easier to analyze and interpret.

In another embodiment, an operation 170 displays on one or more of the parallel axes an upper control limit and/or a lower control limit. Such control limits provide a visual marker from which one can determine if a variable is exceeding, or not meeting, a threshold value. In another embodiment, a visual, audible, or other type of alarm can be triggered when a variable falls out of compliance of the control limits. An example of an upper control limit is illustrated as 230 in FIG. 2A, and an example of a lower control limit is illustrated as 235 in FIG. 2A.

In an embodiment, for example the embodiment illustrated in FIGS. 2A-2D, the values on each parallel axis represent a particular time period. These time periods may be distinguished by the variation of the line properties of each polygonal line. For example, referring again to FIG. 2A, a first time period may be represented by the solid line 220A, a second time period may be represented by the dotted line 220B, a third time period may be represented by the long dash/short dash line 220C, and a fourth time period may be represented by the long dash/two short dash line 220D. FIGS. 2A-2D further illustrate that the different time periods may also be represented as one of the parallel axes—parallel axis 210A in FIG. 2A. Moreover, the properties of the polygonal lines may be partitioned into a first property group and a second property group at operation 175. In such an embodiment, the first property group may relate to previous time periods, and the second property group may relate to present and/or future time periods (i.e., non-previous time periods). Such an embodiment may be used for forecasting, projections, and other similar analyses.

Figure 2A:
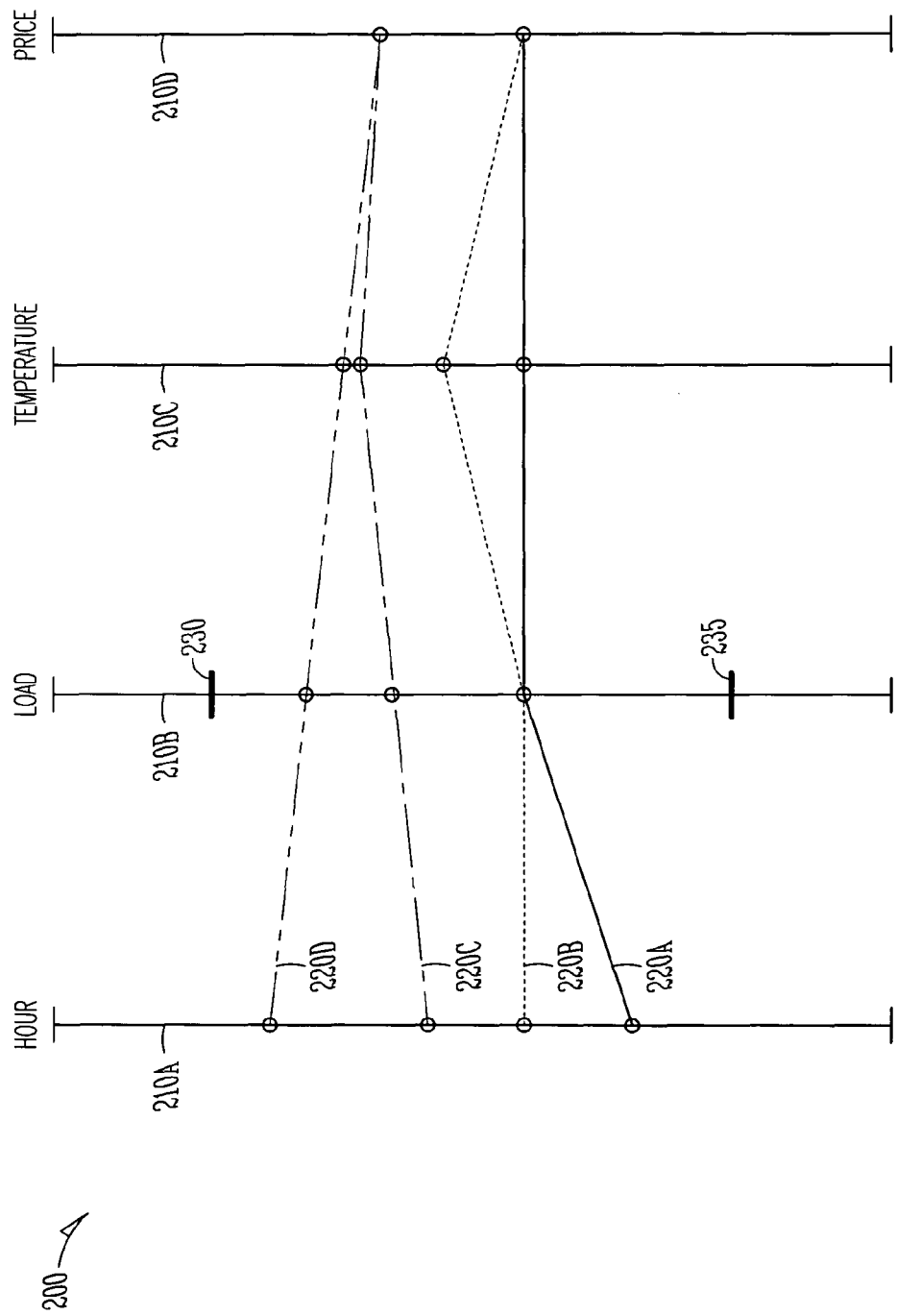
FIGS. 2A, 2B, 2C, and 2D illustrate example embodiments of parallel coordinate plots.
Figure 2B:
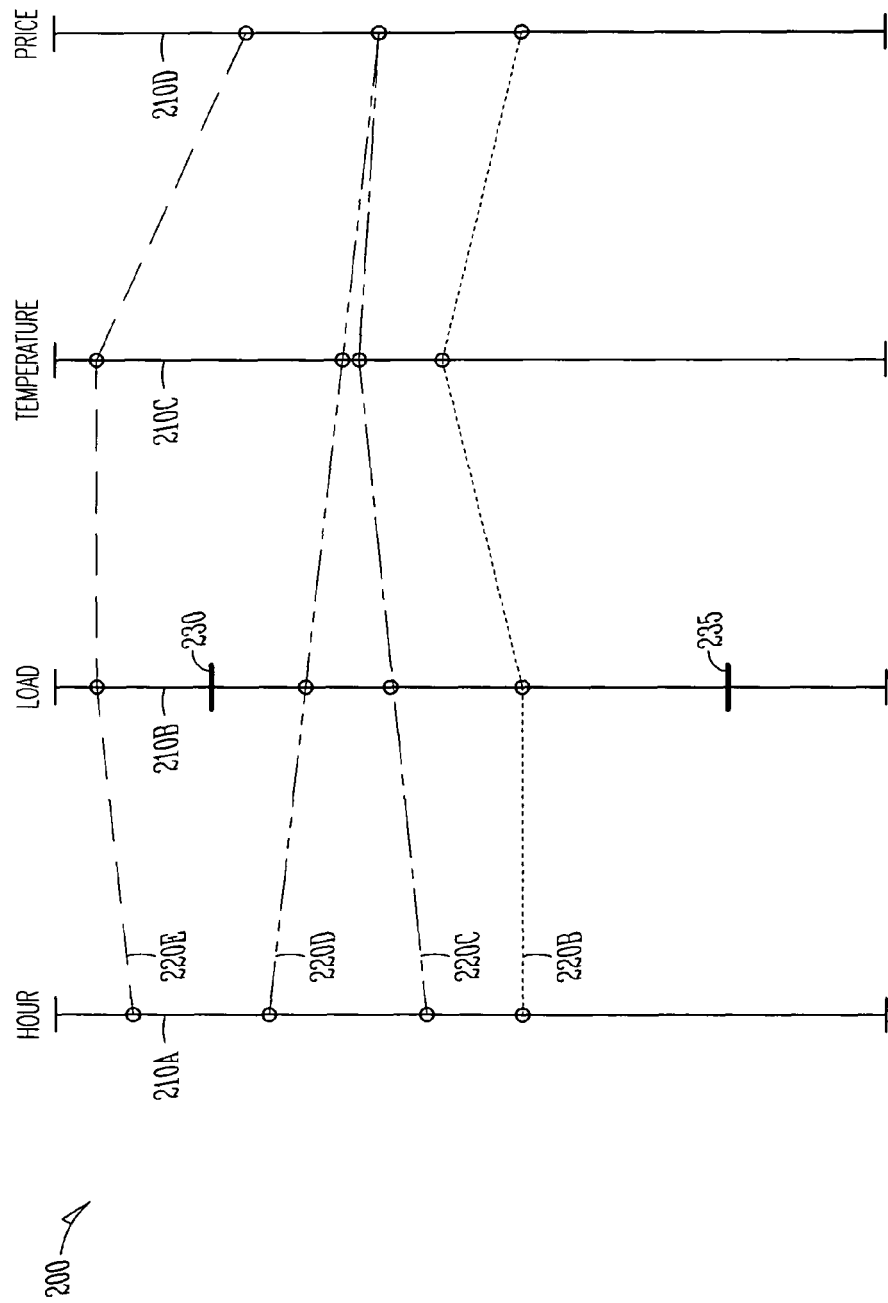
Figure 2C:
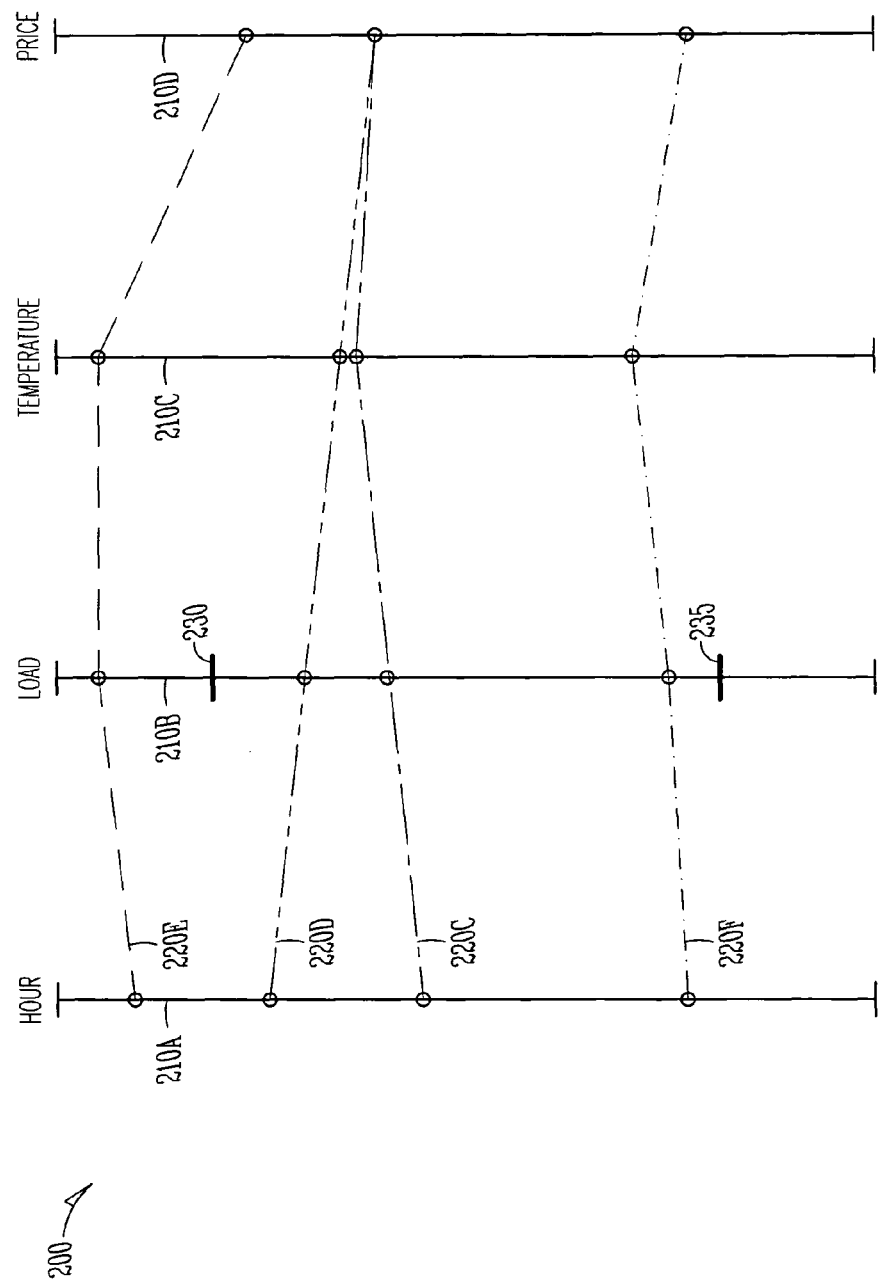
Figure 2D:
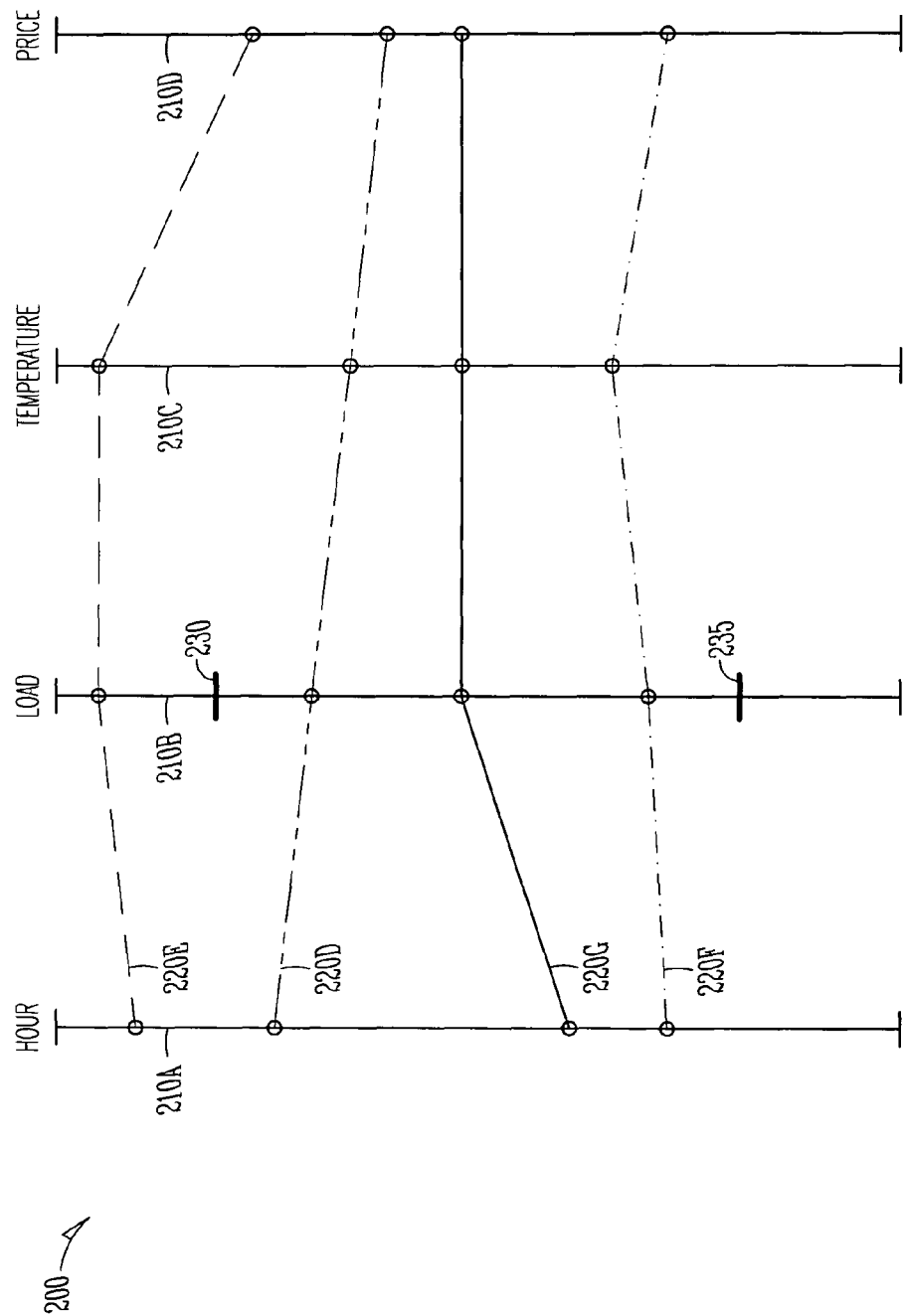

Consequently, a plurality of time periods may be represented on any one parallel coordinate plot. If a new polygonal line is displayed that represents a new time period, a polygonal line from a prior time period may be removed. This dynamic process 180 of adding new polygonal lines and removing prior polygonal lines is illustrated in FIGS. 2A-2D. In FIG. 2A, the lines 220A, 220B, 220C, and 220D are present and illustrate the relationship between time, power load, outdoor temperature, and price per kilowatt hour. Referring now to FIG. 2B, which represents a later time period, line 220E has been added, and line 220A has been removed. It is noteworthy that line 220E, at the point it passes through the axis 210B, exceeds the upper control limit 230. This indicates that some sort of corrective action relating to the power load should be taken. Referring now to FIG. 2C, which is a time period later than the time period illustrated in FIG. 2B, it can be observed that line 220F has been added, and line 220B has been removed. Also, line 220F passes through the load axis 210B at a point that is below the lower control limit 235, thereby indicating that some sort of corrective action may need to be taken. In the final time period of FIG. 2 illustrated by FIG. 2D, it can be seen that line 220G has been added, and that line 220C has been removed. In the embodiment of FIGS. 2A-2D, the polygonal line that is removed is the line that represents the oldest time period. However, another prior line or lines that are not the oldest may instead be removed depending of the needs of the particular application. The removal of polygonal lines as new polygonal lines are added keeps the display of the multivariate data current, and makes the display easier to read, interpret, and analyze.

In an embodiment, the data that is displayed on a parallel coordinate plot is collected and displayed in real time at operation 190. For example, in the case of the parallel coordinate plot of FIGS. 2A-2D showing variables relating to power production, new data may be posted on the parallel coordinate plot on an hourly basis. As previously explained, at some point in time, when new data is displayed, a prior polygonal line may be removed from the plot so that the plot does not become too congested. In yet another embodiment, the data that is displayed on a parallel coordinate plot is retrieved from a database at operation 195. The complete data set may be displayed at one time, or particular segments may be displayed at any one time.

Figure 3:
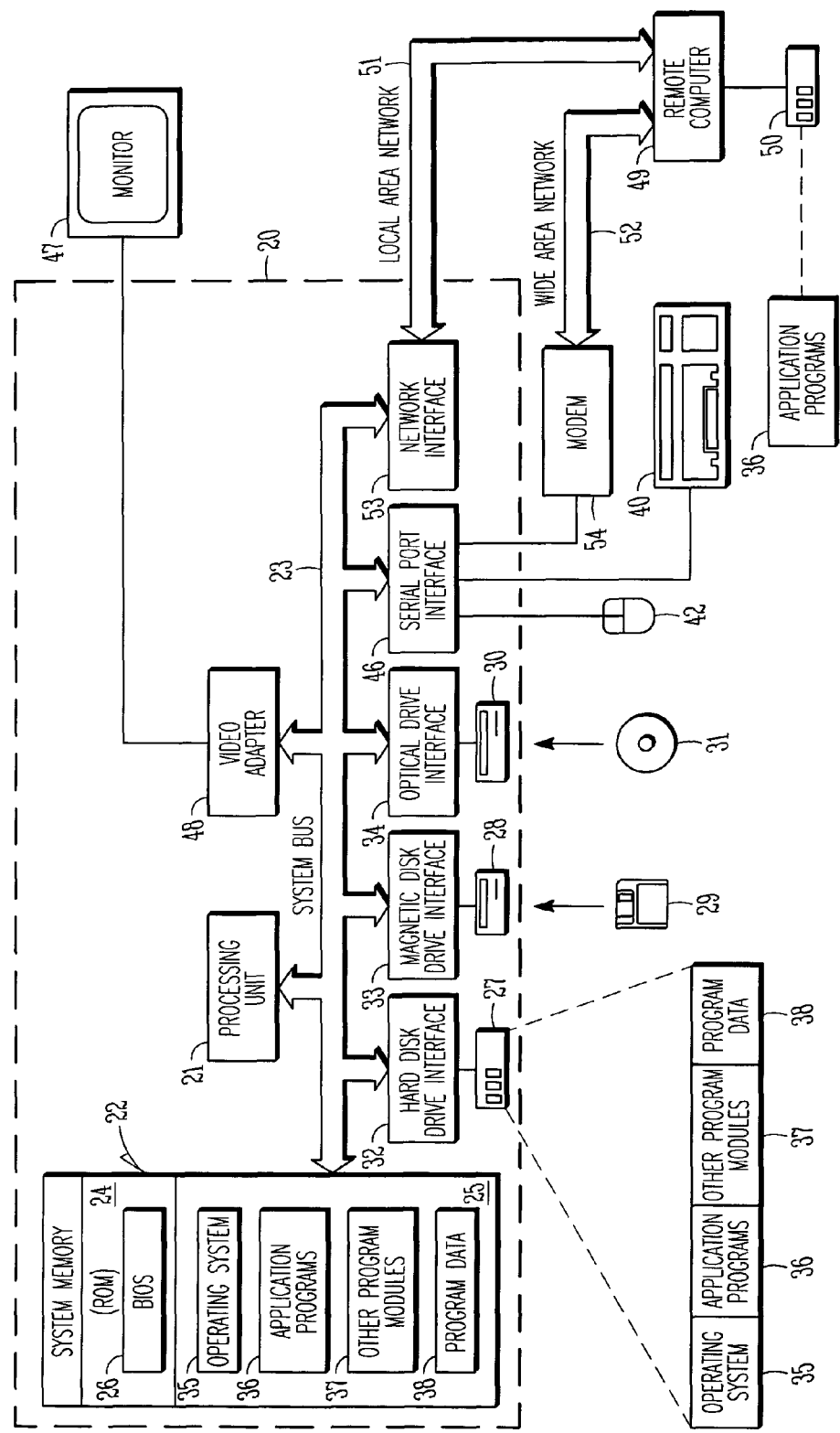
FIG. 3 illustrates an example embodiment of a computer system upon which various embodiments that generate parallel coordinate plots may execute.

FIG. 3 is an overview diagram of a hardware and operating environment in conjunction with which embodiments of the invention may be practiced. The description of FIG. 3 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 3, a hardware and operating environment is provided that is applicable to any of the servers and/or remote clients shown in the other Figures.

As shown in FIG. 3, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 3 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

In the foregoing detailed description of embodiments of the invention, various features are grouped together in one or more embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

The invention claimed is:

1. A computer-implemented method comprising:
    displaying, using a computer processor, a parallel coordinate plot, said parallel coordinate plot comprising a plurality of parallel axes, wherein said parallel axes represent variables, and further wherein values of said variables are connected by one or more polygonal lines;
    displaying, using the computer processor, information about an additional variable on said parallel coordinate plot by varying a property of said one or more polygonal lines, wherein said property correlates to a value of said additional variable;
    displaying, using the computer processor, said polygonal lines from a plurality of previous time periods; and
    removing, using the computer processor, a prior polygonal line from said display when a new polygonal line is displayed for a new time period.

2. The method of claim 1, wherein said information about said additional variable comprises a new variable in addition to said variables represented by said parallel axes.

3. The method of claim 1, wherein said information about said additional variable comprises one or more property groupings.

4. The method of claim 1, wherein said property of said polygonal lines includes one or more of a color, a line style, and a line thickness, and further wherein said color, said line style, and said line thickness correlate to the values of said additional variable.

5. The method of claim 1, wherein said one or more of said parallel axes comprise one or more markers to indicate one or more of an upper control limit and a lower control limit.

6. The method of claim 1,
    wherein said property of said polygonal lines comprises a first property group and a second property group;
    wherein said first property group relates to previous time periods; and further
    wherein said second property group relates to non-previous time periods.

7. The method of claim 1, wherein said parallel coordinate plot comprises data collected in real time.

8. The method of claim 1, wherein said parallel coordinate plot comprises data retrieved from a database.

9. A system comprising:
    a processor configured to display a parallel coordinate plot, said parallel coordinate plot comprising a plurality of parallel axes, wherein said parallel axes represent variables, and further wherein values of said variables are connected by one or more polygonal lines;
    a processor configured to display information about an additional variable on said parallel coordinate plot by varying a property of said one or more polygonal lines, wherein said property correlates to a value of said additional variable;
    a processor configured to display said polygonal lines from a plurality of previous time periods; and
    a processor configured to remove a prior polygonal line from said display when a new polygonal line is displayed for a new time period.

10. The system of claim 9, wherein said information about said additional variable comprises a new variable in addition to said variables represented by said parallel axes.

11. The system of claim 9, wherein said information about said additional variable comprises one or more property groupings.

12. The system of claim 9, wherein said property of said polygonal lines includes one or more of a color, a line style, and a line thickness, and further wherein said color, said line style, and said line thickness correlate to the values of said additional variable; and further wherein said one or more of said parallel axes comprise one or more markers to indicate one or more of an upper control limit and a lower control limit.

13. The system of claim 9,
    wherein said property of said polygonal lines comprises a first property group and a second property group;
    wherein said first property group relates to previous time periods; and further
    wherein said second property group relates to non-previous time periods.

14. A tangible machine readable storage medium comprising instructions for executing a method comprising:
    displaying a parallel coordinate plot, said parallel coordinate plot comprising a plurality of parallel axes, wherein said parallel axes represent variables, and further wherein values of said variables are connected by one or more polygonal lines; and
    displaying information about an additional variable on said parallel coordinate plot by varying a property of said one or more polygonal lines, wherein said property correlates to a value of said additional variable;
    displaying said polygonal lines from a plurality of previous time periods; and removing a prior polygonal line from said display when a new polygonal line is displayed for a new time period.

15. The tangible machine readable storage medium of claim 14, wherein said information about said additional variable comprises a new variable in addition to said variables represented by said parallel axes.

16. The tangible machine readable storage medium of claim 14, wherein said information about said additional variable comprises one or more property groupings.

17. The tangible machine readable storage medium of claim 14, wherein said property of said polygonal lines includes one or more of a color, a line style, and a line thickness, and further wherein said color, said line style, and said line thickness correlate to the values of said additional variable; and further wherein said one or more of said parallel axes comprise one or more markers to indicate one or more of an upper control limit and a lower control limit.

18. The tangible machine readable storage medium of claim 14,
   wherein said property of said polygonal lines comprises a first property group and a second property group;
   wherein said first property group relates to previous time periods; and further wherein said second property group relates to non-previous time periods.

* * * * *